Jan. 3, 1939.　　　　T. J. NUNAN　　　　2,142,255
THREAD TESTING DEVICE
Filed Sept. 12, 1936　　　4 Sheets-Sheet 1

INVENTOR.
Thomas J. Nunan
BY Gifford, Scull & Burgess
ATTORNEYS.

Jan. 3, 1939.  T. J. NUNAN  2,142,255
THREAD TESTING DEVICE
Filed Sept. 12, 1936    4 Sheets—Sheet 2

INVENTOR.
Thomas J. Nunan
BY
Gifford, Scull & Burgess
ATTORNEYS.

Jan. 3, 1939.  T. J. NUNAN  2,142,255
THREAD TESTING DEVICE
Filed Sept. 12, 1936  4 Sheets—Sheet 3
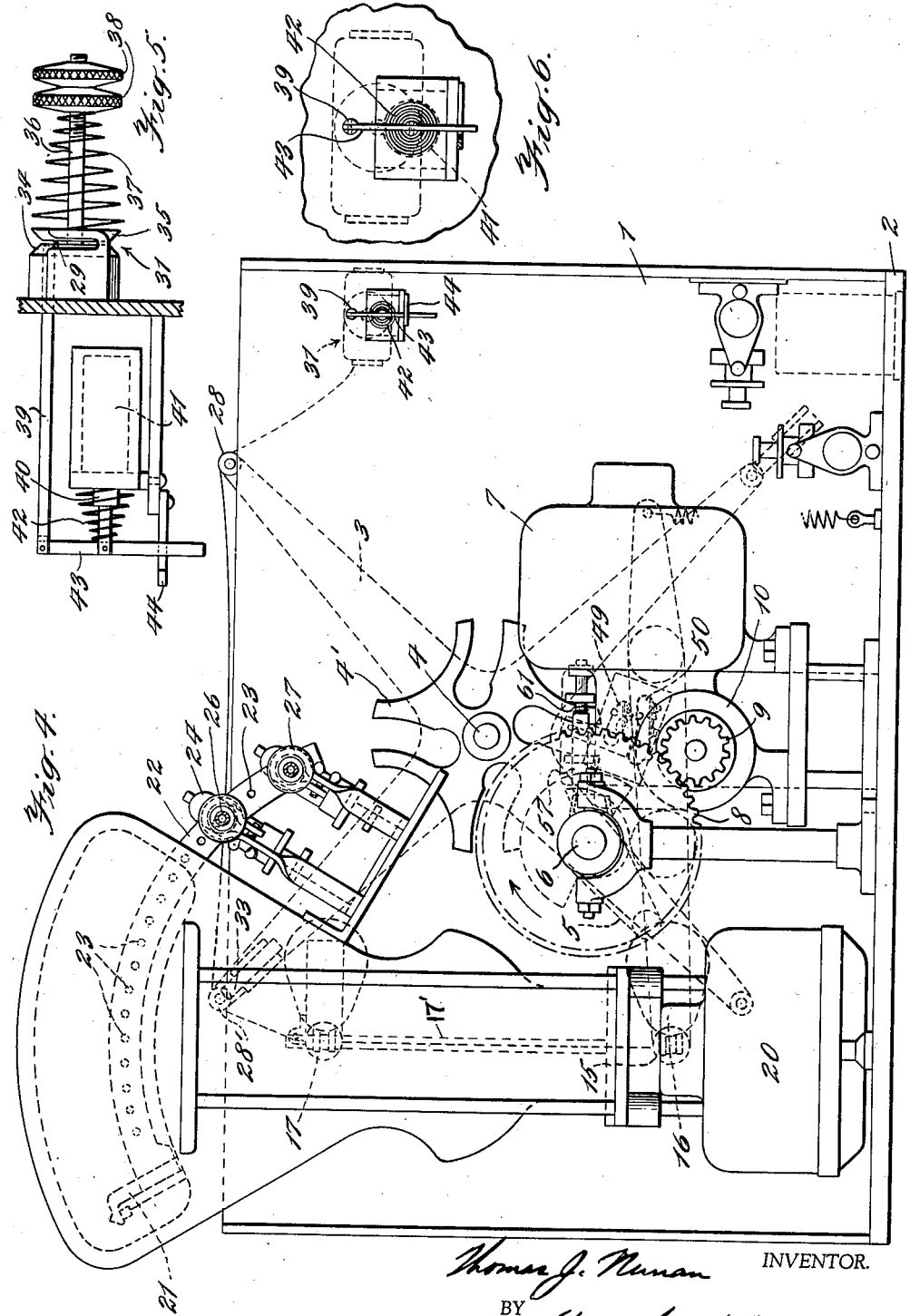
INVENTOR.
Thomas J. Nunan
BY
ATTORNEY.

Jan. 3, 1939. T. J. NUNAN 2,142,255
THREAD TESTING DEVICE
Filed Sept. 12, 1936   4 Sheets-Sheet 4
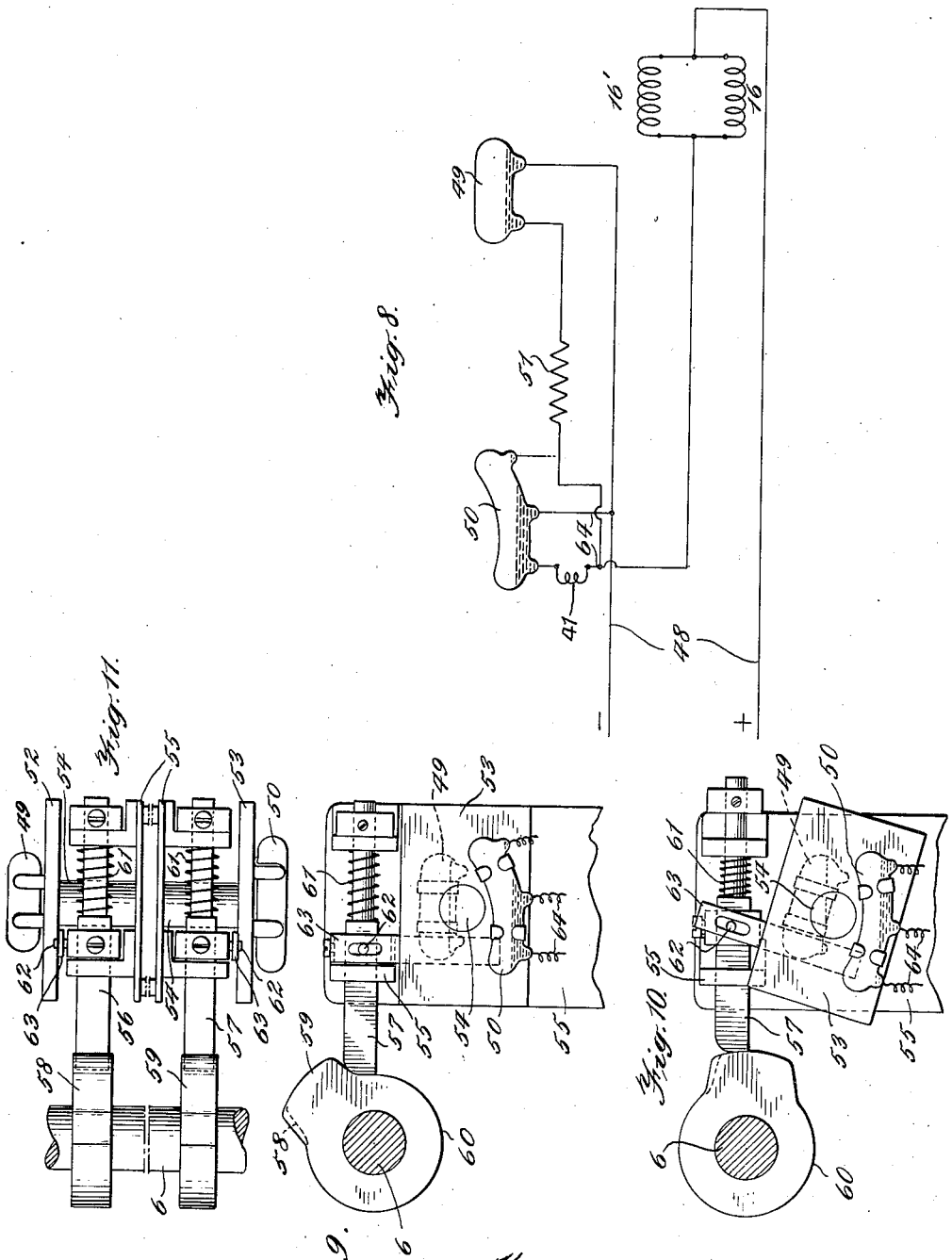

Patented Jan. 3, 1939

2,142,255

UNITED STATES PATENT OFFICE 2,142,255

THREAD TESTING DEVICE

Thomas J. Nunan, Summit, N. J., assignor to The Clark Thread Company, Newark, N. J., a corporation of New Jersey Application September 12, 1936, Serial No. 100,433

5 Claims. (Cl. 73—51)

This invention relates to improvements upon the thread testing device described and claimed in my copending application, Ser. No. 9428, filed March 5, 1935. The device is for testing the tensile strength of thread or the like. The invention will be best understood from the following description and the annexed drawings, in which:

Fig. 3 is a partly sectional view of the structure appearing in Fig. 2 as seen from the left of that figure;

Fig. 4 is a view of the device as seen from the back of Fig. 2;

Fig. 5 is a partly sectional view on an enlarged scale showing certain details as appearing in Fig. 3;

Fig. 6 is a view taken from the left of Fig. 5;

Fig. 7 is a horizontal sectional view through one of the clamps taken approximately on the line 7—7 of Fig. 2;

Fig. 8 is a wiring diagram of so much of the circuit controlling operation of the device as is necessary to an understanding of the invention claimed herein;

Fig. 9 is a view approximately on the line 9—9 of Fig. 3;

Fig. 10 is a view on the same plane as Fig. 9 but showing the parts in different positions;

Fig. 11 is a plan view of the structure appearing in Figs. 9 and 10.

Figure 1:
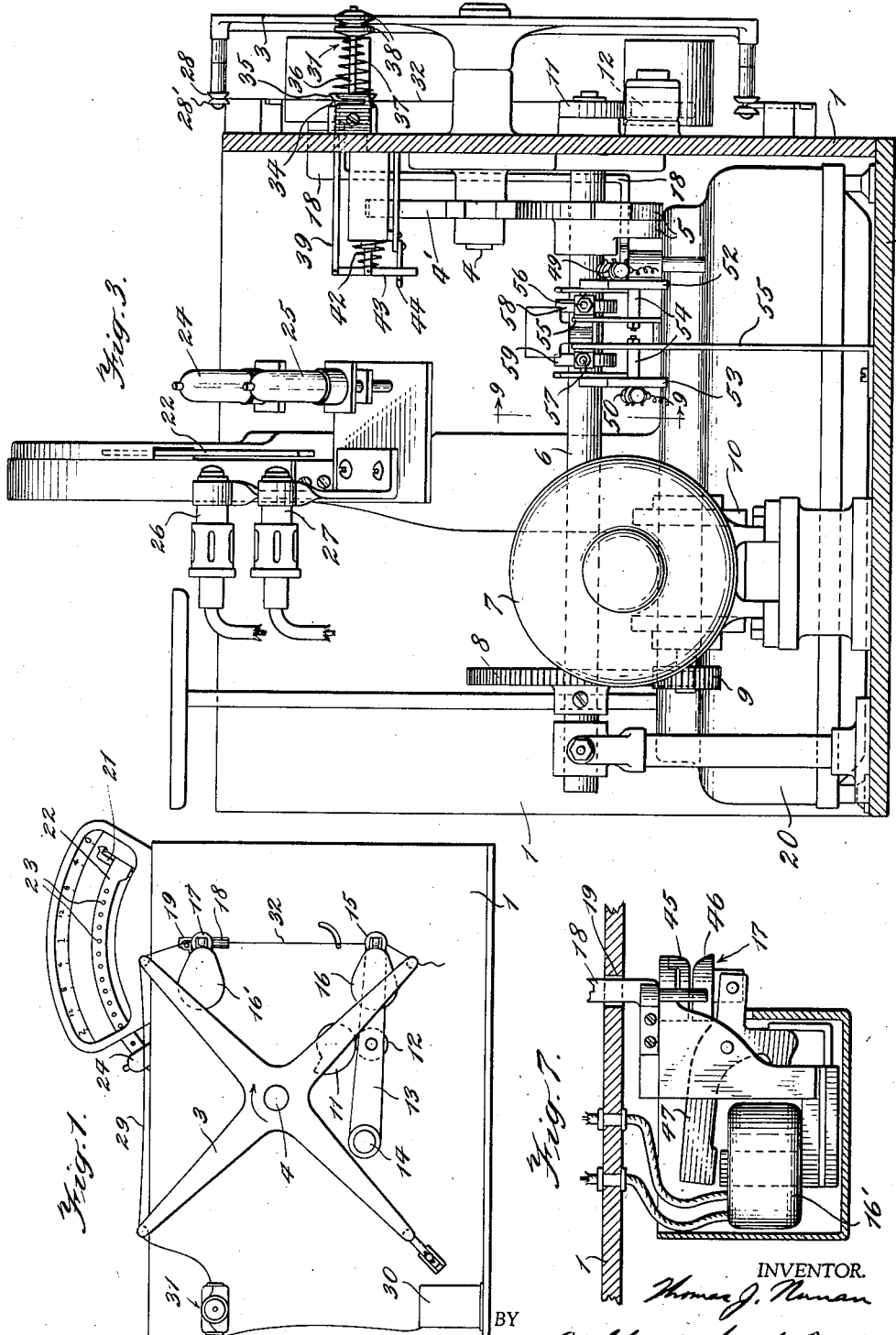
Fig. 1 is a face view of a thread testing device having my invention embodied therein.

The device described and claimed herein will be referred to as a thread testing device for the purpose of convenience, although the word "thread" is not to be construed in a limiting sense, since the device may be used, for example, when testing wire, rope, or any other article which can be handled in the manner described.

The device may comprise a suitable support 1, here shown in the form of a panel extending upwardly from a base 2. On the front of the support is disposed a rotary frame 3 supported upon a shaft 4 extending through the support and having thereon rearwardly of the panel a cross 4' forming the driven part of a Geneva movement, the driving part 5 of which is fixed on a shaft 6 which is driven from a motor 7 through a gear 8 mounted on the shaft 6 and a pinion 9 driven from the motor through suitable reduction gearing contained in a housing 10. The details of this reduction gearing are not important to an understanding of this invention and therefore will not be further described.

The shaft 6 extends through the panel 1, and on the front end thereof carries a cam 11 engaging a roller 12 on a lever 13 pivoted at 14 on the panel. The other end of the lever 13 supports a breaking clamp 15 controlled by a solenoid 16 and cooperating with an indicator clamp 17 supported on a bracket 18 which extends through a slot 19 in the panel. The bracket is secured to a movable part (indicated in Fig. 4 at 17') of a scale 20 provided with a pointer 21 to which is secured a shutter 22 having a plurality of holes 23 therein spaced apart a distance corresponding to the number of indications of ounces on the face of the scale. This shutter is disposed between two lamps 24 and 25 disposed on one side thereof and light sensitive cells 26 and 27 disposed on the opposite side thereof and in position to be affected by light passing through holes 23 in the shutter, as more fully described and claimed in my copending application Ser. No. 128,995, filed March 4, 1937.

The frame 3 has a plurality of arms, here shown as four in number, and each of which has on the end thereof a feed clamp 28 adapted to engage thread 29 supplied from a source 30, and between the frame and the source is disposed a tension device designated generally by the numeral 31.

As set forth more fully and as claimed in my aforesaid copending application, the frame may be given an intermittent rotation by means of the Geneva movement illustrated, and at each intermittent movement a length of thread is drawn from the source 30 through the tension device 31 and brought into position to be engaged by the clamps 15 and 17. The solenoids 16 and 16' are then operated to clamp the thread between the jaws of the clamps 15 and 17, after which the cam 11 causes depression of the lever 13 carrying with it the clamp 15. The tension on the length 32 of thread between the clamps will pull the clamp 17 downwardly and thus act upon the indicator exemplified by the scale, since the clamp 17 is mounted upon a movable part of the scale, in this instance the part which normally would support the platform of this type of scale. The details of the scale mechanism are not necessary for an understanding of the invention and therefore will not be described. All that is necessary to know is that the action on the scale causes movement of the pointer 21 and the shutter associated therewith. Movement of the shutter permits light to pass from the lamps through the holes in the shutter and thus send impulses through an electrical circuit, which impulses in turn operate a recorder in the manner more fully described and claimed in said copending application or in divisions thereof. The details of this circuit and the manner in which the recorder is operated by the circuit are not claimed herein and therefore their details will not be further described.

Each feed clamp 28 is adapted to engage thread 29 with sufficient force to pull it through the tension device 31 from the source of supply, and the clamp 28 nearest the indicator clamp 17 is opened by a release member 33 so that this feed clamp will not hold back the length 32 of thread between the clamps 15 and 17, as the indicator clamp is pulled down by the tension on this length of thread. When the thread is being broken between the clamps 15 and 17, the feed clamp 28 nearest the tension device 31 will normally engage the thread lightly, and the jaws of the clamp will not be forced apart to positively clamp the thread therebetween. These jaws, indicated at 28' in Fig. 3, are spring-pressed towards each other, as more fully shown and claimed in said copending application, and the thread will rest lightly upon these jaws until the frame 3 is rotated in the direction of the arrow shown in Fig. 2, at which time clamp 28 nearest the clamp 17 will move away from release member 33, allowing said clamp 28 to grip the thread with sufficient force at this point to pull it through the tension device 31, but it will rest lightly upon the jaws of the next feed clamp.

Figure 2:
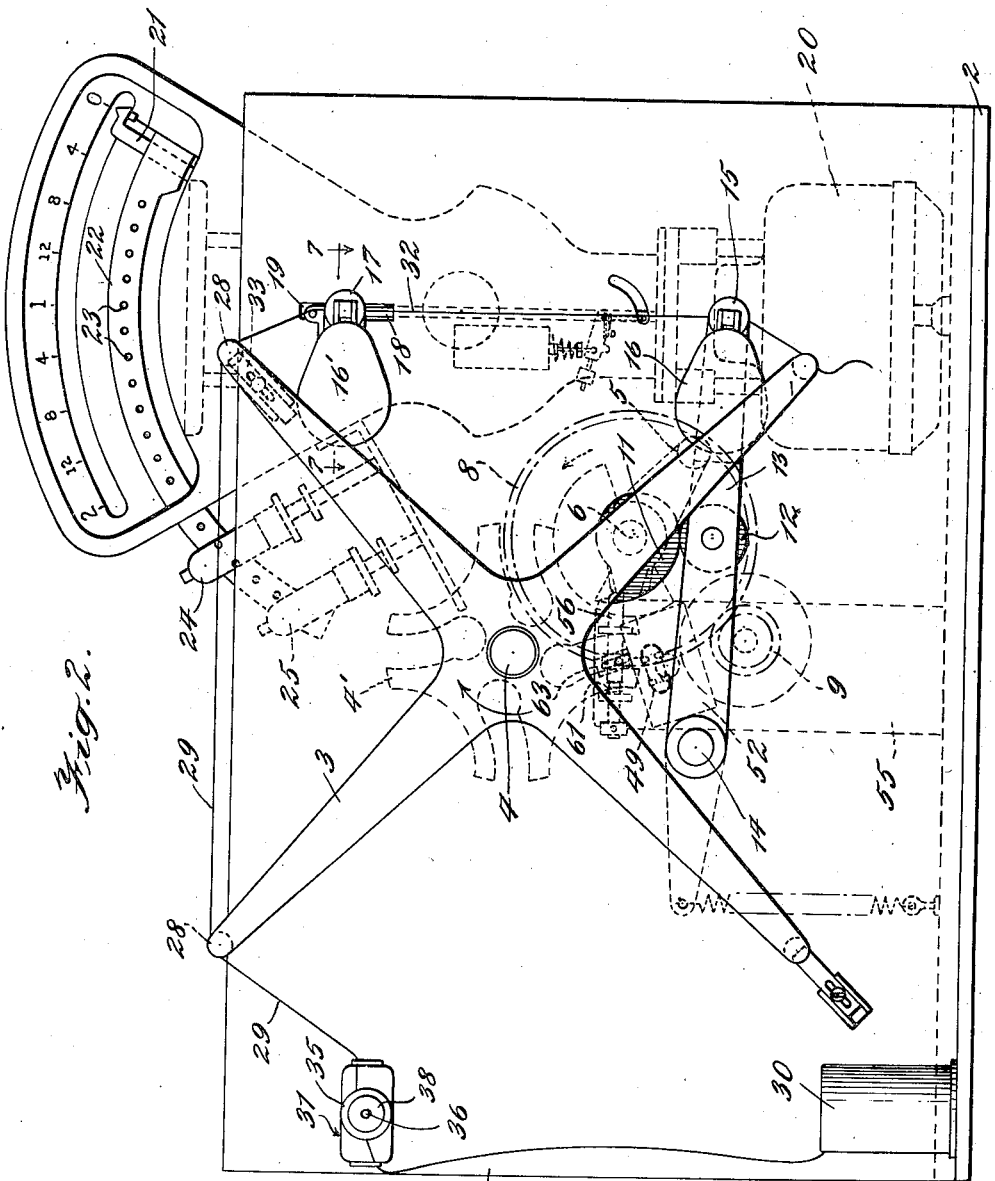
Fig. 2 is a view on the same plane as Fig. 1 but on an enlarged scale and showing further details.

Ordinarily, there is enough slack between the two clamps 28 shown at the top of Fig. 2 so that the indicator clamp 17 can move freely downwardly without exerting any tension upon the thread between the clamp 17 and the tension device. As I have just stated above, the thread is released from the feed clamp 28 adjacent the clamp 17 and is riding loosely on the clamp 28 adjacent the tension device. However, to avoid any possibility of tension developing in thread between the indicator clamp 17 and the tension device 31, I provide means for releasing the tension device from the thread passing therethrough before any tension is placed upon the length 32 of thread, to break the same. That means will now be described.

As best shown in Figs. 5 and 6, the tension device comprises two guides 34 and 35, the guide 34 being relatively stationary, and the guide 35 being loosely mounted upon a spindle 36, and the guides being lightly held together by a compression spring 37 which may be adjusted by means of the adjustment nuts 38 threaded on the spindle. Ordinarily, when thread is passing through the tension device, it will occupy some such position as that shown at 29 in Fig. 5 and thus the spring 37 will be exerting a drag upon the thread as it passes between the two guides. However, shortly before tension is supplied to the length 32 of thread, I cause the guide 35 to be moved to the right, as viewed in Fig. 5, and against the action of the spring 37, this being done by means of a pin 39 passing through the guide 34 and adapted to engage the guide 35 and push it to the right against the action of the spring 37. This pin may be secured to the armature 40 of a solenoid 41 and may be urged towards the left of Fig. 5 by means of a spring 42 acting against a cross piece 43 connected to the pin. Movement of the crosspiece 43 and consequently the pin under the action of the spring 42 may be limited by means of a stop 44. The circuit for operating the solenoid will be more fully described later.

In order to avoid any possible weakening of the thread by the clamps 15 and 17 as they engage it, I have provided means for causing this engagement to take place in two steps, so that the thread will be engaged at first lightly by the jaws and then with a firmer engagement sufficient to hold the thread while it is being broken.

In Fig. 7 I have shown the clamp 17 and the solenoid for operating it, and a similar arrangement is used for the clamp 15. In each case, the clamp comprises two jaws 45 and 46, the jaw 45 being relatively fixed and the jaw 46 being movable with respect thereto and actuated by the solenoid 16' which actuates its armature 47 to move the jaw 46 towards the jaw 45 when the solenoid is energized. The entire clamp and solenoid are mounted upon the bracket 18, which may be considered the movable part of the scale 20, since it is connected to that part.

Referring now more particularly to Figs. 8, 9, 10, and 11, electric current may be supplied to the solenoids 16 and 16' from any suitable source of power, here indicated as a line 48, the current also passing through two mercury switches 49 and 50 arranged in parallel, the switch 49 having in series therewith a resistance 51. The switch 50 is shown as being a double-throw mercury switch, since this switch is normally used for other purposes which, however, are not necessary for an understanding of this invention and therefore will not be further described. For the purposes of this application, the switch 50 may be considered as of the same type as the switch 49.

Referring now to Figs. 3, 9, and 10, the switches 49 and 50 are mounted upon blocks 52 and 53 which are pivoted upon pivots 54 rotatably mounted on a suitable support 55. The two blocks 52 and 53 are operated by plungers 56 and 57 engaged by cams 58 and 59, respectively, upon the shaft 6.

Each cam is provided with a face 60 concentric with the shaft 6 and also with a nose or projection adapted to engage its plunger. Each plunger is slidably mounted upon the support 55 and is urged towards its cam by means of a compression spring 61. The movement of a plunger controls the position of its block by means of a pin 62 projecting from a plunger and movable in a slot in an arm 63 secured to one of the blocks. In Figs. 9 and 10 one of these arrangements is shown, and it is duplicated for the other block.

In operation, and assuming that the length 32 of thread is being broken, the circular parts 60 of the two cams engage their respective plungers, and the two switches are in the positions shown in Fig. 9 wherein both will be closed, and consequently the clamps will grip the thread, the clamp solenoids having the full voltage applied thereto through the switch 50.

After a thread length is broken, the two noses 58 and 59 will engage their respective plungers 56 and 57 and serve to open both switches, as shown in Fig. 10. For the purposes of this application, the switch 50 controls the two leads 64, the third lead from the switch being inactive so far as the operation of the clamps is concerned. Then, when in the position shown in Fig. 10, the switch 50 may be considered opened.

As the operation of the device continues, however, the noses of the cams 58 and 59 will permit the plungers to return to the left of Figs. 9 and 10 under the action of the springs 61, and it will be noted that the nose of the cam 58 will permit the plunger 56 to return first, and this in turn will close the switch 49 to again energize the clamp solenoid through the resistance 51, this resistance of course cutting down the voltage applied to the solenoids.

Immediately after the above action, the plunger 57 will be moved towards the left of Figs. 9 and 10. This will close the switch 50, thus applying full voltage to the solenoids 16 and 16', and causing the clamps to engage the thread with maximum force. Since these clamps were already in engagement with the thread, I may conveniently use the closing of the switch 50 to energize the solenoid 41, to release the tension device 31.

While I have shown the invention as embodied in a specific form, it is to be understood that various changes in details may be made without departing from the scope of the invention, as defined by the appended claims.

I claim:

1. A thread testing device comprising an indicator having a part movable as a force is applied thereto, a pair of clamps one of which is secured to said movable part and the other of which is movable with respect thereto, means to feed successive lengths of thread into engagement with both of said clamps, means to actuate the clamps to engage the thread, means to move said movable clamp away from the one secured to said movable part and thereby apply force to said movable part through the thread, a tension device controlling the tension of thread being fed to said clamps, and means to render said tension device inoperative before movement of said movable clamp takes place and after engagement of the clamps with the thread.

2. A thread testing device comprising an indicator having a part movable as a force is applied thereto, a pair of clamps one of which is secured to said movable part and the other of which is movable with respect thereto, means to feed successive lengths of thread into engagement with both of said clamps, means to actuate the clamps to engage the thread, means to move said movable clamp away from the one secured to said movable part and thereby apply force to said movable part through the thread, a tension device controlling the tension of thread being fed to said clamps, a solenoid so designed and energized as to release said tension device, and means to actuate said solenoid before movement of said movable clamp takes place and after engagement of the clamps with the thread.

3. A thread testing device comprising an indicator having a part movable as a force is applied thereto, a pair of clamps one of which is secured to said movable part and the other of which is movable with respect thereto, means to feed successive lengths of thread into engagement with both of said clamps, means to actuate the clamps to engage the thread, means to move said movable clamp away from the one secured to said movable part and thereby apply force to said movable part through the thread, a tension device controlling the tension of thread being fed to said clamps, solenoids so designed and energized as to control said clamp-actuating means, a solenoid so designed and energized as to release said tension device, means to actuate said clamp solenoids to cause the clamps to engage the thread before said movement of said movable clamp, and means to actuate said last-named solenoid to release said tension device after actuation of said clamp solenoids and before said movement of said movable clamp.

4. A thread testing device comprising an indicator having a part movable as a force is applied thereto, a pair of clamps one of which is secured to said movable part and the other of which is movable with respect thereto, a source of supply of thread, a rotary frame having a plurality of feed clamps spaced around the center thereof and each adapted to engage thread, a tension device between said source and said frame, means to intermittently rotate said frame to bring two of said feed clamps into position to place a length of thread in engagement with the clamps of the pair, means to move said movable clamp away from the one secured to said movable part and thereby apply force to said movable part through the thread, means to actuate the clamps of the pair to engage the thread, solenoids so designed and energized as to control said clamp-actuating means, a solenoid so designed and energized as to release said tension device, circuits controlling said solenoids and having switches therein, and means controled by rotation of said frame and adapted to open and close said switches at predetermined times.

5. A thread testing device comprising a clamp having two jaws adapted to engage thread therebetween, a solenoid, means actuated by energizing the solenoid to move one jaw towards the other to clamp thread therebetween, and means to energize said solenoid, first with a voltage that will cause said jaws to engage the thread lightly and then with a higher voltage that will cause a firmer engagement of the thread.

THOMAS J. NUNAN.